Nov. 23, 1971     J. D. DITSON     3,621,754

METHOD AND APPARATUS FOR FORMING THREADS

Filed Sept. 26, 1969

INVENTOR
J. D. DITSON
BY
Frank H. Thomas
ATTORNEY

United States Patent Office 3,621,754
Patented Nov. 23, 1971

3,621,754
METHOD AND APPARATUS FOR FORMING THREADS
J. D. Ditson, Asbury, N.J., assignor to Ingersoll-Rand Company, New York, N.Y.
Filed Sept. 26, 1969, Ser. No. 861,283
Int. Cl. B23c 3/28
U.S. Cl. 90—11.58                           10 Claims

ABSTRACT OF THE DISCLOSURE

A method and apparatus for cutting threads on a workpiece. The workpiece is held stationary. The cutting tool axis is parallel and eccentric to the longitudinal axis of the workpiece. The cutting tool is rotated at high speed about its own axis to make a circular cut in the workpiece. The cutting tool axis is orbited at a low rotational speed about the axis of the workpiece and advanced along the axial length of the workpiece in timed relation to the orbital movement to thereby form a thread on the workpiece.

BACKGROUND OF THE INVENTION

This invention relates to a method and apparatus for forming threads on a workpiece and more particularly to a method and apparatus for cutting rounded threads on a workpiece.

Prior to the present invention, many well-known techniques have been employed for forming threads. These techniques employed various machines which ranged from a relatively simple engine lathe to sophisticated milling and thread hobbing machines. Such techniques have the disadvantage that in many cases several passes of the cutting tool over the workpiece are required to form the final thread configuration. This repetition of operations can result in a time consuming and expensive method of cutting threads. If a single pass of the cutting tool over the workpiece is used, forming time can be greatly reduced. Another disadvantage of prior techniques is that threads cannot be cut in very hard material. It is necessary to cut the thread and then harden the material.

In order to form a thread on hardened metals with a single pass of the tool over the workpiece a technique sometimes referred to as "thread whirling" has been developed. In this method of cutting threads on a workpiece, the cutting tool is in continuous cutting contact with the workpiece to thereby permit the cutting of harder metals than is possible with other thread cutting techniques. In "thread whirling" the cutting tool is rotated at a high speed on an axis which is parallel and eccentric to the axis of the workpiece. Relative rotation is established between the workpiece and the cutting tool so that the circular path of the cutting tool orbits about the workpiece at a slower speed. The cutting tool is advanced along the length of the workpiece in timed relation to the relative movement between the workpiece and the cutting tool so that a thread is formed. The pitch of the groove cut by the cutting tool is a small fraction of the pitch of the formed thread. The resultant thread has a smooth surface not readily obtainable with other methods of cutting threads.

The thread whirling method of cutting threads is illustrated in U.S. Pat. Nos. 2,875,661 and 2,979,993. In both these prior patents, however, it is necessary to rotate both the cutting tool and the workpiece. Rotation of the workpiece is particularly disadvantageous if "thread whirling" is to be used in an assembly line method of manufacture or in forming threads on workpieces which cannot readily be rotated. By the present invention, a method of "thread whirling" has been provided which eliminates the necessity of rotating the workpiece.

SUMMARY

It is therefore the principal object of this invention to provide a method and apparatus for forming a thread on a workpiece which lends itself to use with assembly line techniques for mass production.

It is another object of this invention to provide a method and apparatus for forming threads on a workpiece which can be applied to forming threads on hardened metal.

It is a still further object of this invention to provide a relatively simple method and apparatus for forming threads on a workpiece.

In general, the foregoing and other objects will be carried out by providing a method of forming a continuous thread upon the surface of workpiece comprising the steps of: mounting the workpiece on its longitudinal axis; mounting and rotating a cutting tool at a first speed in a circular path about an axis parallel and eccentric to the longitudinal axis of said workpiece; presenting said cutting tool to said workpiece so that said cutting tool makes a circular cut in said workpiece normal to the longitudinal axis of said workpiece; revolving said cutting tool in an orbital path about the longitudinal axis of said workpiece at a speed slower than said first speed; and advancing one of said workpiece and cutting tool along the other of said workpiece and cutting tool so that a continuous thread is formed on the surface of said workpiece. The objects of this invention are also carried out by providing apparatus for cutting a continuous thread on the surface of a workpiece comprising: a frame; means for mounting a workpiece on said frame and for preventing rotation of said workpiece relative to said frame; cutting tool means; means for rotatably mounting said cutting tool means on said frame so that the longitudinal axis of the cutting tool means is parallel and eccentric to the longitudinal axis of the workpiece; means for rotating said cutting tool at a first speed about its longitudinal axis for making a circular cut in the surface of said workpiece; means for orbiting said cutting tool means about the longitudinal axis of said workpiece at a speed slower than said first speed; and means for advancing said cutting tool means along the length of the workpiece for cutting a continuous thread along the length of said workpiece.

BRIEF DESCRIPTION OF THE DRAWING

This invention will be described in connection with the annexed drawing wherein.

DESCRIPTION OF THE PREFERRED EMBODIMENTS

Figure 1:
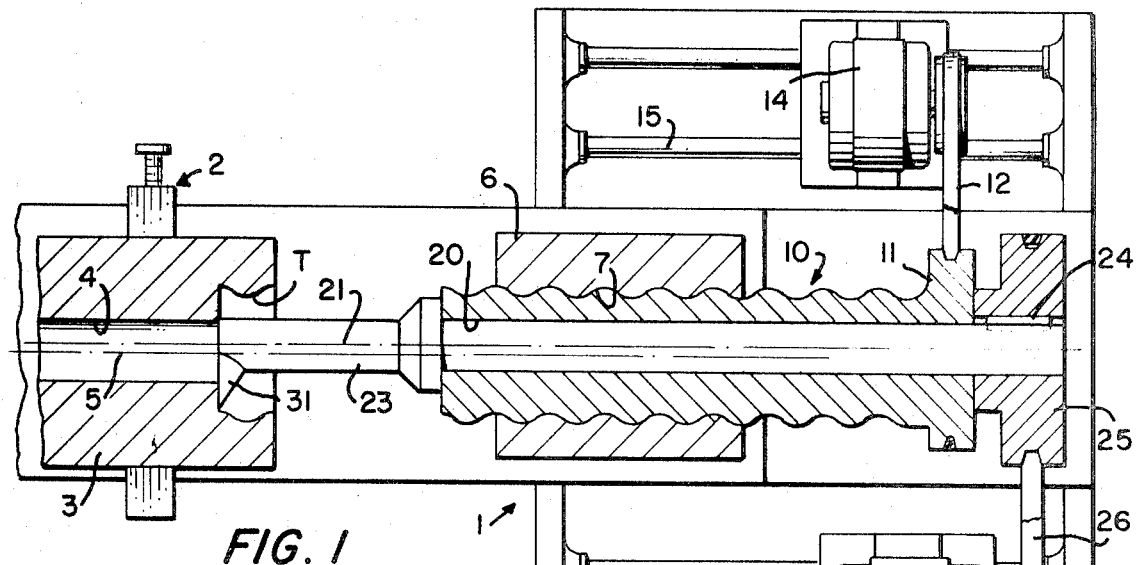
FIG. 1 is a top plan view, partially in section, of apparatus for carrying out the method of the present invention.

Referring to the drawing and in particular to FIG. 1 there is shown a frame generally indicated at 1 which includes a vise 2 for holding a workpiece 3 on the frame 1 and preventing rotation of the workpiece relative to the frame. The workpiece may be gun drilled to provide a longitudinal bore 4 therethrough having a longitudinal axis 5. The frame 1 is provided at its other end with means for cutting a thread on the workpiece. The invention will be described as it is applied to cutting an internal thread on a cylindrical member. It is intended, however, that the invention not be limited thereby and is equally applicable to cutting an external thread.

A support member 6 is mounted on the frame 1 and spaced from the workpiece 3. The support 6 has a bore 7 extending therethrough which is coaxial with the longitudinal axis 5 of the workpiece 3. The inside of the bore 7 is in the form of a thread similar in shape to the shape of the thread to be formed on the workpiece 3. Although the thread on the bore 7 has been illustrated as having a rounded configuration, it should be understood that other thread configurations can be used. The pitch of the thread on the bore 7 is the same as the pitch on the thread to be formed on the workpiece.

A bushing means 10 is rotatably mounted in the longitudinal bore 7. The bushing 10 has a threaded outer surface which mates with the threaded inner surface of the bore 7 so that when the bushing means 10 is rotated, it will be advanced through the bore 7 of the support means 6 in timed relation to the rotation of the bushing 10. The end of the bushing means 10 farthest from the workpiece 3 is provided with pulley means 11 which may be integral with the bushing 10 or a seperate, keyed pulley arrangement. A belt or other suitable drive arrangement 12 connects the bushing means 10 with motor means 14 mounted on the frame 1 by means of guides 15. The guides 15 permit the motor 14 to advance relative to the frame and support 6 as the bushing means 11 moves through the support 6.

The bushing means 10 is provided with a longitudinal bore 20 therethrough having a longitudinal axis 21 which is parallel with the longitudinal axis of the bushing means 10 and the longitudinal axis 5 of the workpiece 3 but eccentric to these longitudinal axes. A cutting tool arbor generally indicated at 23 is rotatably mounted in the bore 20. The end of the arbor 23 farthest from the workpiece is provided with a pulley 25 secured to the arbor 23 by means of a key 24. A belt or other suitable drive 26 connects the arbor 23 with a motor drive 28 slidably mounted on the frame 1 by means of guides 29 in a manner similar to the motor 14. An abutment means 30 is mounted on the arbor 23 to insure that as the bushing means 10 advances relative to the support 6 the arbor 23 also advances relative to the support 6. A cutting tool of any well-known type 31 is mounted on the arbor 23 adjacent the workpiece 3.

In operation, the cutting element 31 is brought into contact with the workpiece 3. The cutting tool arbor 23 is rotated by means of the motor 28 at a high speed such as 1500 to 2500 r.p.m. depending upon the various factors such as metal hardness which are conventionally used to determine cutting speed. The cutting tool 31 makes a circular cut in the workpiece 3. The bushing means 10 is rotated at a slow speed, on the order of 3 r.p.m., and the rotation of the bushing means 10 causes the arbor 23 which is eccentric to the bushing means 10 and the workpiece 3 to orbit about the longitudinal axis 5 of the workpiece and to advance along the axial length of the workpiece 3. The slow orbital movement of the cutting element 31 produces an orbital movement of the circular cutting path of the cutting element 31 around the workpiece. This orbital movement of the circular cutting path plus the timed advance of the cutting tool along the length of the workpiece produces a continuous rounded thread T in the workpiece 3. The advance of the cutting element is timed with the orbital movement of the cutting element to thereby form a thread of the same pitch as the thread on the bushing means 10 and bore 7.

Unlike many prior methods of cutting threads, with the present invention, the workpiece need not be rotated. The method and apparatus of the present invention therefore lend themselves to assembly line techniques of mass production.

If the generation of a thread is interrupted, the workpiece rotated 180°, and thread generating resumed, a mismatched or discontinuous thread is formed. This can be desirable for applications where it is necessary to avoid unlimited engagement of mating parts that are threaded along their entire length. This can also be accomplished by brief disengagement and re-engagement of the lead screw, while the cutting tool is whirling. The whirling process, using a single point tool, also permits thread generation to the base of a blind hole for the entire circumference of the hole without need for an undercut to assure bottoming of the mating piece. When a mating part is intended to bottom, this is preferable to the incomplete bottom thread formed by milling-cutter type processes. Furthermore a single point tool does not require an accurate form profile which is difficult and expensive to maintain.

Figure 2:
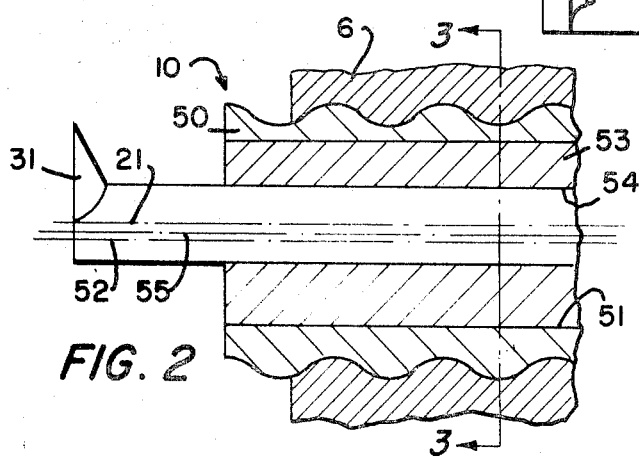
FIG. 2 is a fragmentary sectional view of a modification of the present invention.
Figure 3:
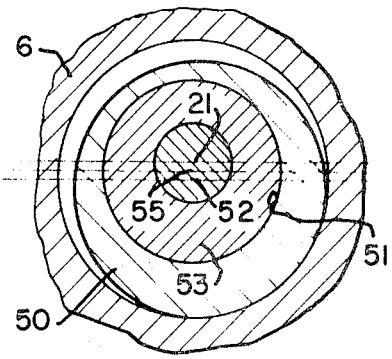
FIG. 3 is a sectional view taken on line 3—3 of FIG. 2.

The thread depth is determined by the amount of eccentricity between the longitudinal axis 5 of the workpiece 3 and the longitudinal axis 21 of the cutting arbor 23. The thread depth is twice this offset. In FIGS. 2 and 3, I have illustrated apparatus which permits variation in the amount the longitudinal axis of the cutting arbor is offset from the longitudinal axis of the workpiece.

In the embodiment of FIGS. 2 and 3 the bushing means 10 includes a sleeve member 50 having an eccentric bore 51 therethrough with its longitudinal axis designated 52. The sleeve 50 has an outer surface in the form of a thread similar to the bushing means 10 of FIG. 1 for feeding the cutting tool along the length of the workpiece in timed relation to the orbital movement of the cutting tool about the longitudinal axis of the workpiece. A plug 53 is rotatably mounted within the bore 51 and is provided with a bore 54 therethrough. The longitudinal axis 55 of the bore 54 is parallel to and offset from the longitudinal axis of the bore 51 and the longitudinal axis 21 of the bore 7 in the support 6. By rotating the plug 53 relative to the sleeve 50, the distance between the longitudinal axis 52 of the sleeve bore 51 and the longitudinal axis 21 of the sleeve can be varied. Hence, the offset between the longitudinal axis of workpiece and the longitudinal axis of the cutting tool arbor can be varied to thereby vary the depth of thread and the diameter of the thread which will be cut. Suitable means for locking the plug 53 to the sleeve 50 may be provided so that once the offset between the arbor 23 and the sleeve 50 is at the desired amount, rotation of the sleeve 50 will not alter this offset.

Figure 4:
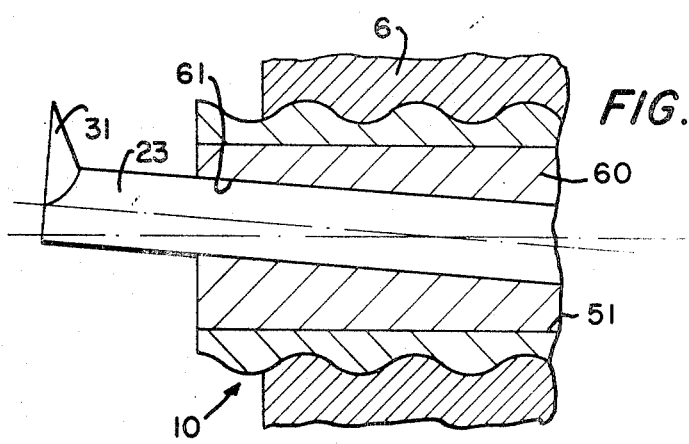
FIG. 4 is a sectional 'view of a further modification of the present invention.

In FIG. 4, I have shown a means for varying the whirling diameter of the arbor 23. In this manner the diameter of the thread cut can be altered. As in FIG. 2 the bushing means 10 is made up of a sleeve 50 having an eccentric bore 51 therethrough. In this embodiment, however, the plug 60 is provided with an angular bore 61 therethrough. The arbor 23 may be moved in and out of the bore 61 to thereby vary the extension of the cutting tip beyond the centerline of the workpiece. Hence, the size of the circular cut made by the cutting tool may be varied to thereby vary the diameter of the thread cut. As in FIGS. 2 and 3, the plug 60 may be rotated relative to the sleeve 50 to vary the eccentricity between the workpiece and the cutting tool arbor to thereby vary the thread depth.

From the foregoing it is apparent that the objects of this invention have been carried out. A relatively simple apparatus has been provided for cutting threads on a workpiece. The method permits hard metals to be cut at high rates of speed. The method of forming the threads lends itself particularly well to assembly line and mass production techniques.

I claim:

1. Apparatus for generating a continuous thread on the surface of a workpiece comprising:
   a frame;
   means for mounting a workpiece on said frame and for preventing rotation of said workpiece relative to said frame;
   at least one single point cutting tool means;
   means for rotatably mounting said cutting tool means on said frame so that the longitudinal axis of the cutting tool means is parallel and eccentric to the longitudinal axis of the workpiece;
   means for rotating said cutting tool at a first speed about its longitudinal axis for making a circular cut in the surface of said workpiece;

means for orbiting said cutting tool means about the longitudinal axis of said workpiece at a speed slower than said first speed;

said means for rotatably mounting said cutting tool means also providing means for advancing said cutting tool means along the axial length of the workpiece for cutting a continuous thread along the length of said workpiece; and means for varying the radius of whirl of the tool about its axis.

2. The apparatus of claim 1 further comprising means for adjusting the eccentricity between the longitudinal axis of said cutting tool means and the longitudinal axis of said workpiece.

3. The apparatus of claim 1 wherein said means for rotatably mounting said cutting tool means on said frame includes support means having a bore therethrough mounted on said frame and spaced from said workpiece; the bore in said support means having its longitudinal axis coaxial with the longitudinal axis of said workpiece; and bushing means rotatably mounted in said support means and having a bore therethrough which is parallel and eccentric to the longitudinal axis of the bore in said support means; said cutting tool means being rotatably mounted in said bore in said bushing means.

4. The apparatus of claim 3 further comprising means for rotating said bushing means at a speed slower than said first speed to thereby define said means for orbiting said cutting tool means.

5. The apparatus of claim 4 wherein said means for advancing said cutting tool means includes the surface of the bore in said support means having a pitch similar to the pitch of the thread to be cut on said workpiece, the outer surface of said bushing means having a similar shape whereby the rotation of said bushing means moves said bushing means in the direction of its longitudinal axis, and means for transferring the longitudinal movement of said bushing means to said cutting tool means.

6. The apparatus of claim 5 further comprising means for adjusting the eccentricity between the longitudinal axis of said cutting tool means and the longitudinal axis of said workpiece.

7. The apparatus of claim 6 wherein said eccentricity adjusting means includes said bushing means having a sleeve means rotatably mounted in the bore in said support means and having an eccentric bore therethrough and plug means rotatably mounted in said sleeve; said bore in said bushing means being in said plug means.

8. Apparatus for generating a continuous thread on the inner surface of a cylindrical workpiece comprising:

a frame;

means for mounting a workpiece having a longitudinal bore therein on said frame;

support means having a bore therethrough mounted on said frame and spaced from said workpiece;

the bore in said support means being coaxially aligned with the bore in said workpiece;

bushing means rotatably mounted in the bore in said support means and having a bore therethrough which is parallel and eccentric to the longitudinal axis of the bore in said workpiece;

at least one single point cutting tool means rotatably mounted in the bore in said bushing means and extending outwardly from said support means toward said workpiece;

means for rotating said cutting tool means at a first speed for making a circular cut in said workpiece;

means for rotating said bushing means at a speed slower than said first speed for orbiting said cutting tool means about the longitudinal axis of said workpiece;

said bushing means also providing means for advancing said cutting tool means along the length of said workpiece in timed relation to the orbital speed of said cutting tool means.

9. The apparatus of claim 8 wherein said means for mounting said workpiece on said frame prevents said workpiece from rotating relative to said frame, and the surface of the bore in said support means has a shape similar to the shape of the thread to be cut on said workpiece, the outer surface of said bushing means having a matching shape so that when said bushing means is rotated relative to said support means, said bushing means moves along the longitudinal axis of the bore in said support means relative to said support means and said cutting tool means includes abutment means so that longitudinal movement of said bushing means is transferred to said cutting tool means to thereby define the means for advancing said cutting tool means.

10. The apparatus of claim 9 further comprising means for adjusting the eccentricity between the longitudinal axis of said workpiece and the longitudinal axis of said cutting tool means, and means for varying the radius of whirl of the tool about its axis.

References Cited
UNITED STATES PATENTS 1,316,718  9/1919  Hall _____ 90—11.58 X GIL WEIDENFELD, Primary Examiner U.S. Cl. X.R.

90—11.42, 11.54